United States Patent
Rouxel et al.

[11] 3,790,764
[45] Feb. 5, 1974

[54] TIME DELAY COMPENSATION IN A CLOSED LOOP PROCESS CONTROL SYSTEM

[75] Inventors: Roland Rouxel, Seyssinet; Gabriel Chevalier, Grenoble, both of France

[73] Assignee: Societe Generale de Constructions Electriques et Mecaniques, Paris, France

[22] Filed: Dec. 23, 1971

[21] Appl. No.: 211,803

Related U.S. Application Data

[62] Division of Ser. No. 16,212, March 3, 1970, Pat. No. 3,644,719.

[30] Foreign Application Priority Data

Mar. 3, 1969   France .............................. 69.05752

[52] U.S. Cl. .............................. 235/150.1, 318/621
[51] Int. Cl. ............................................. G05b 6/02
[58] Field of Search ...................... 235/150.1, 151.1

[56] References Cited
OTHER PUBLICATIONS
"A Controller to Overcome Dead Time" by Smith, ISA Journal, February 1959, Vol. 6, No. 2, pages 28–33.

*Primary Examiner*—Eugene G. Botz
*Attorney, Agent, or Firm*—Arthur O. Klein

[57] ABSTRACT

The deleterious effect of time lag in an industrial process on the operation of a closed loop feedback control system in which such process is regulated may be substantially eliminated without sacrificing static accuracy of the system by a specially designed process controller. The controller includes first and second networks connected in tandem in the main path of the feedback loop through one input of a first subtracter. The controller output is coupled to one input of a second subtracter through a third network whose transfer function is equal to the product of the first network transfer function and the equivalent unretarded transfer function of the controlled process. The output of the third network is also coupled to the other input of the second subtracter through a retardation circuit having the same delay characteristics as that of the process. The output of the second subtracter is connected to the second input of the first subtracter to provide the required process control signal at the output of the second network.

2 Claims, 9 Drawing Figures

3,790,764

TIME DELAY COMPENSATION IN A CLOSED LOOP PROCESS CONTROL SYSTEM

This is a division of U.S. Pat. Ser. No. 16,212, filed Mar. 3, 1970, now U.S. Pat. No. 3,644,719.

BACKGROUND OF THE INVENTION

Many industrial processes are regulated by feedback control systems wherein the response of the process is suitably sampled and compared with a command to the system to generate an input error signal. The input error signal in turn drives a controller which provides the required process control signal.

Many such controlled processes exhibit a substantial time delay between the application of the control signal thereto from the controller and the desired response of the process. The effect of such unwanted time delays on feedback systems whose controllers employ the usual types of proportional-derivative-integral control is a more oscillatory and unstable system response. While it is true that such added instability may be corrected in part by reducing the overall gain of the feedback system, such reduction in gain leads inevitably to a corresponding reduction in static accuracy which may prove intolerable in the regulation of the particular process in question.

SUMMARY OF THE INVENTION

A more advantageous way of compensating for system instabilities due to time lags in the regulated process without a corresponding reduction in static accuracy of the system is provided with the arrangement of the present invention. The controller supplying the regulating signal for the process includes a first network whose input is coupled to the input error signal and whose output is coupled to a first subtracter. The controller output terminal is coupled to a first input of a second subtracter through a second network whose transfer function is the product of the transfer function of the first network and the effective unretarded transfer function of the process. The output of the second network is also coupled to a second input of the second subtracter through a retarding circuit whose transfer function is equal to the effective retardation transfer function of the process. The output of the second subtracter is applied to the second input of the first subtracter. A third network is coupled to the output of the first subtracter for converting such output into the process control signal which includes a component that cancels the effective retardation portion of the process transfer function.

In an illustrative embodiment, in which the transfer function of the process is empirically determined to be of the form $K_0 \div (1+pT_0)$ multiplied by a retardation function, where $p$ is the LaPlace operator, the first network has a linear transfer function $1/K_0$; the second network has a transfer function $1/pT_0$; and the third network operates on the output of the first subtracter by another linear factor to form the process regulating signal.

Additionally, suitable facilities may be provided in at least the second network and its associated components (i.e., the retardation circuit and the second subtracter) for processing the associated signals in N-bit digital form to reduce the size and bulk of the apparatus.

BRIEF DESCRIPTION OF THE DRAWING

The nature of the invention and its advantage will appear more fully from the following detailed description taken in conjunction with the appended drawing, in which.

DETAILED DESCRIPTION

Figure 1:
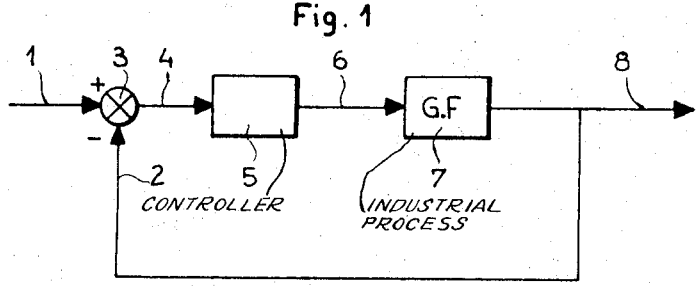
FIG.1 is a block diagram illustrating a generalized closed loop regulating system for an industrial process having an internal time delay.

Referring now to the drawing, FIG.1 shows a block diagram of a feedback control system in which an industrial process represented by the block 7 may be regulated in accordance with a command applied at a terminal 1 of the system. The process 7 may be associated with one of many types of material or energy transfer apparatus such as chemical reactions, distillation columns, cement ovens, industrial boilers, and the like, which exhibit a characteristic time lag between the application of a control signal at a termianl 6 and the output response at a terminal 8.

The type of process considered for this application may be approximated, by mathematical models based on empirical data, to have a transfer function of the general form $G \times F$, where G is an equivalent unretarded transfer function of the form $$K_0/(1 + pT_0)(1 + pT_1)(1 + pT_2),$$

and F is a retardation function of the form $e^{-pT_0}$. It will be assumed for the following discussions that G may be approximated by the function $K_0/1+pT_0$.

In the feedback system illustrated in FIG.1, the output of the process 7 is suitably sampled and fed back via a line 2 to one input of a subtracter 3. The command on line 1 is coupled to the other input. The resulting error signal (designated X) on an output 4 of the subtracter 3 is coupled to an input of a controller 5, which derives a corresponding regulating signal Y for controlling the process.

Under ideal conditions, the use of proportional control together with commonly used integral or differential corrections thereto permits the controller to be adjusted to provide an overall transfer function of the feedback system which yields both good transient and good steady state response. Unfortunately, process time lags of the type described above causes the otherwise properly adjusted systems to become more oscillatory and unstable. Any further attempt to correct such additional instability by lowering the effective gain constant of the main path of the feedback loop will usually adversely affect the static accuracy of the system to an unacceptable degree.

Figure 2:
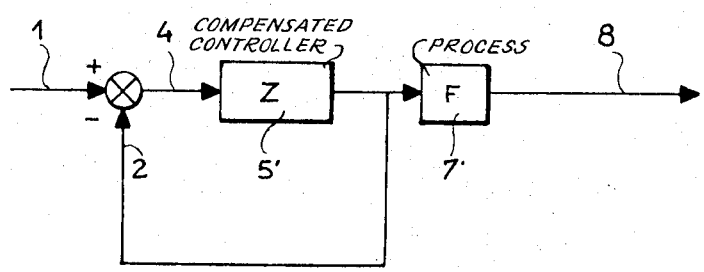
FIG.2 is a block diagram depicting the elimination of the effect of such time delay on the closed loop control system of FIG.1.

In accordance with the invention, the controller is provided with compensating networks for removing the undesired effects of the time delay of the process 7 from the closed feedback loop, so that the additional instability normally caused thereby is eliminated without necessity of sacrificing static accuracy. As shown generally in FIG.2, the net effect of such compensation is to functionally remove the retardation component F of the process transfer function to a point outside the closed loop so that the transfer function of the main control path is the product of the transfer function of the compensated controller (designated 5') and the unretarded process transfer function 6 of the process 7.

Figure 3:
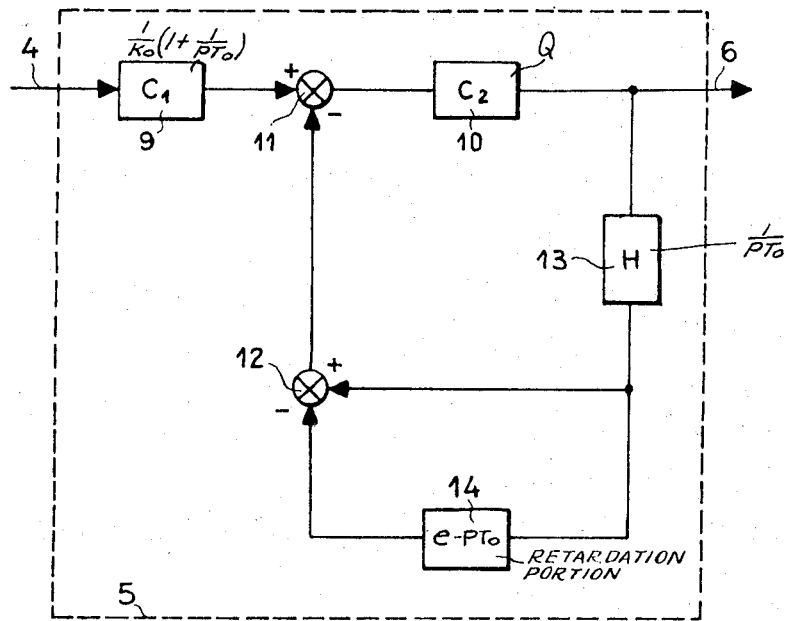
FIG.3 is a block diagram of a controller constructed in accordance with the invention for eliminating the effect of process time delay in the arrangement of FIG.1.

A generalized controller design for accomplishing this desired result is shown in FIG.3. The input error signal on the line 4 is applied through a first network 9 having a transfer function $C_1$ to a first input of a subtracter 11. The output of the subtracter 11 is applied through a second network 10 having a transfer function $C_2$ to a controller output terminal T to provide the required regulating output signal Y on the line 6.

The terminal T is coupled to the input of a third network 13 whose transfer function H is the product of the transfer function $C_1$ of the network 9 and the unretarded transfer function G of the controlled process. The output of the network 13 is applied directly to one input of a second subtracter 12, and through a retardation circuit 23 to a second input of the subtracter 12. The transfer function of the retardation circuit 23 is identical to the retardation portion F of the transfer function of the process. The output of the subtracter 12 is coupled to a second input of the subtracter 11.

Figure 4:
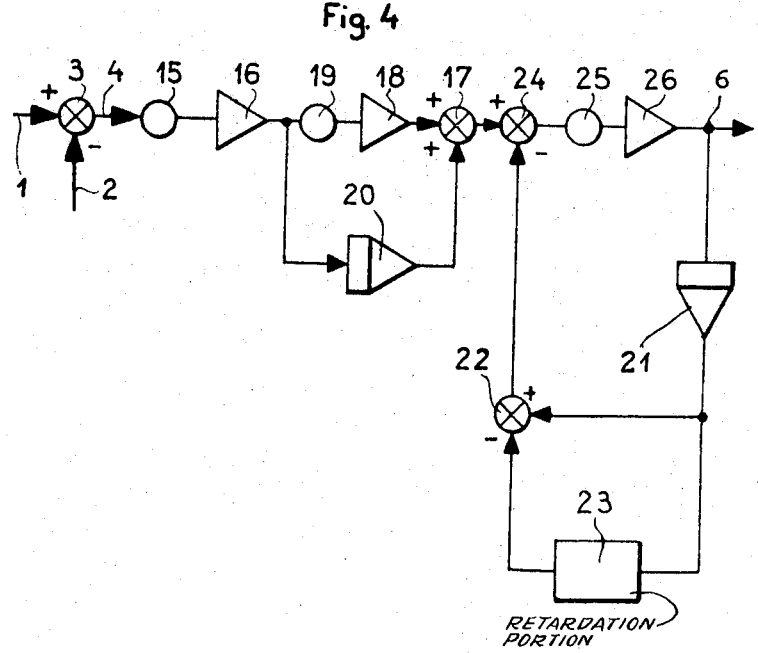
FIG.4 is a combined block and schematic diagram of a first embodiment of the arrangement of FIG.3.

One specific manner of instrumenting the controller design of FIG.3 is shown in FIG.4. The network 9 has a main path including a pair of potentiometers or other gain-setting devices 15 and 19 alternating with a pair of amplifiers 16 and 18. The output of the amplifier 18 is coupled to one input of an adder 17. A junction of the amplifier 16 and the potentiometer 19 is coupled through an integrator 20 to a second input of the adder 17. The output of the adder 17 is coupled to one input of the subtracter 11.

For purposes of illustration, the potentiometer 15 may be adjusted so that the combined transfer function of the components 15 and 16 is equal to $1/K_0$, and the potentiometer 19 may be adjusted so that the combined transfer function of the components 18 and 19 is unity. Also, the transfer function of the integrator 20 may be adjusted to $1/pT_0$. As a result, the overall transfer function of the network 9 is $C_1=(1/K_0)(1+1/pT_0)$.

Since the transfer function of the network 13 must be equal to $C_1 \times G$, and since G was assumed above to be of the form $K_0/1 + pT_0$, the resulting transfer function of the network 13 in FIG.4 is $(1/pT_0)$. Thus, the network 13 may be embodied by a suitably adjusted integrator 21.

The network 10, which is embodied in FIG.4 by a potentiometer 25 and an amplifier 26, may be set to have a suitable line or transfer function Q which yields the required amplitude of the regulating signal Y to properly run the process 7.

Figure 5:
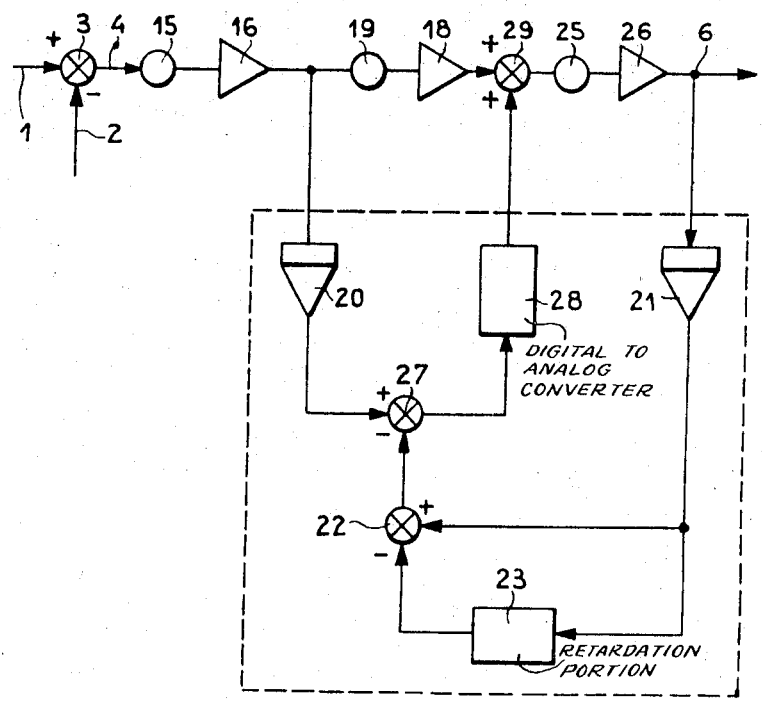
FIG.5 is a combined block and schematic diagram similar to FIG.4 but including analog-digital conversion facilities.

It will be evident to those skilled in the art that the analog techniques employed in such types of industrial process control loops require components that are relatively heavy and bulky. To help alleviate the weight and bulk problem, a portion of the circuit shown in FIG.4 may advantageously be instrumented by digital techniques. FIG.5 shows a modification of the arrangement of FIG.4 which permits the use of digital techniques in the portion of the circuit shown within dotted lines including an auxiliary subtracter 27. The digital portions of this embodiment conveniently may be instrumented by integrated circuits, thin-film devices, and other lightweight items commonly used for digital processing.

To permit this reduction in size and bulk, the integrators 20 and 21 are provided with suitable analog to digital conversion facilities. Additionally, a digital to analog convertor 28 is interposed between the auxiliary subtractor 27 and an adder 29 in the main path of the loop. (In FIG.5, it is assumed that the effective transfer function of the converter 28, and the combined transfer function of the potentiometer 19 and the amplifier 18 are both unity.) Under these circumstances, the circuit of FIG.5 is functionally identical to that of FIG.4.

Figure 6:
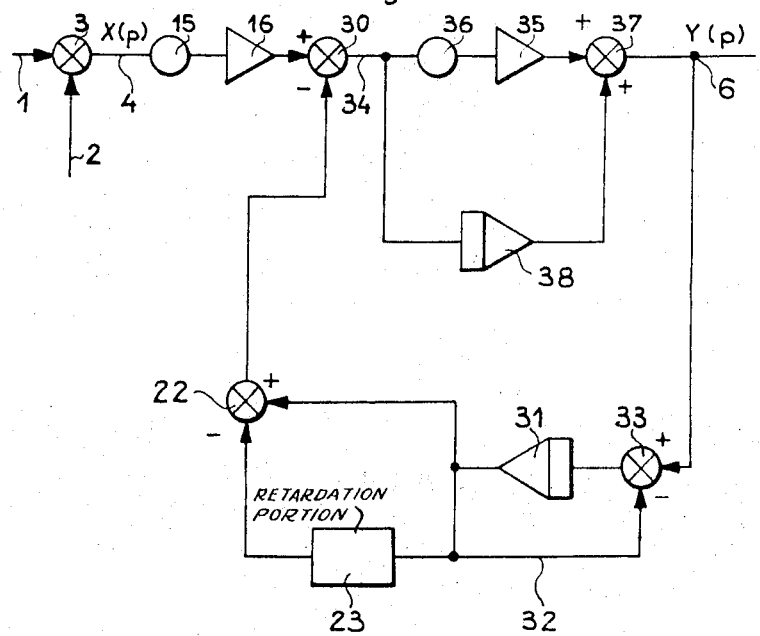
FIG.6 is a combined block and schematic diagram of a second embodiment of the arrangement of FIG.3.

Referring now to FIG.6, there is shown an alternative embodiment of the controller of FIG.3 for providing the required time delay compensation for the process to be controlled. In this case the network 9 includes a potentiometer 15 and an amplifier 16 which are adjusted to have a combined transfer function $1 \div K_0$. The network 10 at the output of the subtracter 11 has two parallel branches, one containing a potentiometer 36 and an amplifier 35 whose combined transfer function may be set to the value Q, while the second branch includes an integrator 38 having a transfer function $Q \div pT_0$. The output of the amplifier 35 and the output of the integrator 38 are applied to respective inputs of an adder 37, whose output is coupled to the terminal T. Hence, the transfer function of the network 10 is equal to $Q [1 + 1/pT_0]$.

The network 13 of FIG.6 includes an integrator 31 having a transfer function $1 \div pT_0$. The integrator 31 is coupled to the output of a subtracter 33. One input of the subtracter 33 is connected to the terminal T while the other input of the subtracter 33 receives a fedback signal from the integrator 31 via a line 32. The resulting transfer function of the network 13 is therefore $1 \div (1 + pT_0)$. The remainder of the circuit of FIG.6 is identical to that of FIG.4.

Figure 7:
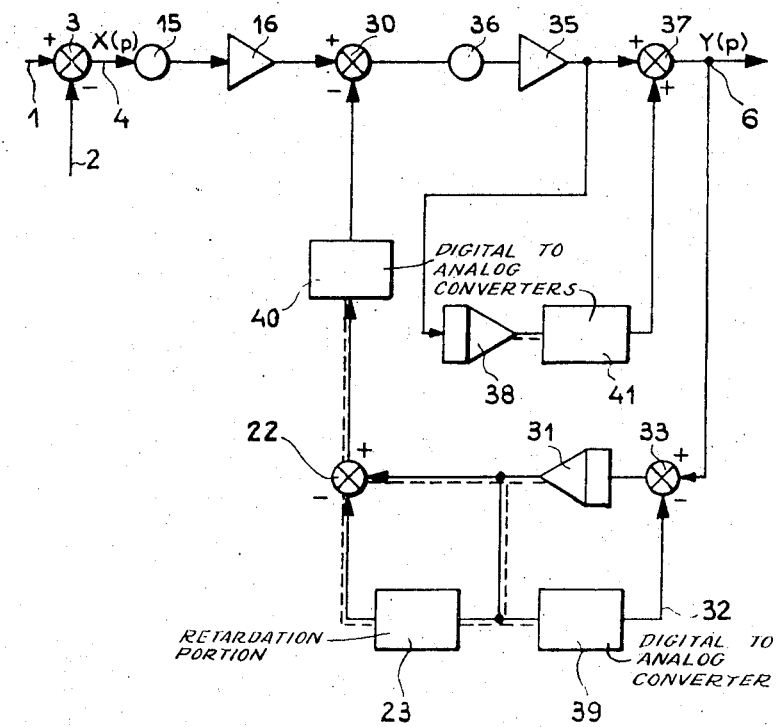
FIG.7 is a combined block and schematic diagram similar to FIG.6 but including analog-digital conversion facilities.

FIG.7 is a modification of FIG.6 which includes analogdigital conversion facilities. Elements 31 and 38 are integrators. The subtracter 11 and the retardation circuit 23 are digital components. Digital to analog converters are coupled to the outputs of the integrators 31 and 38 and the subtracter 11. Functionally, the arrangement of FIG.7 is similar to that of FIG.6.

Figure 8:
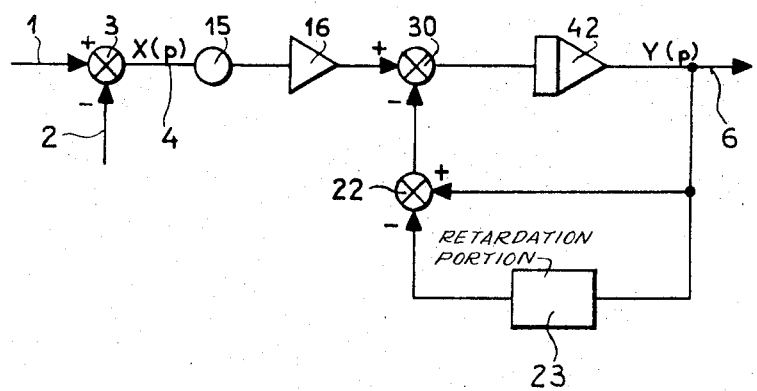
FIG.8 is a combined block and schematic diagram of a third embodiment of the arrangement of FIG.3.
Figure 9:
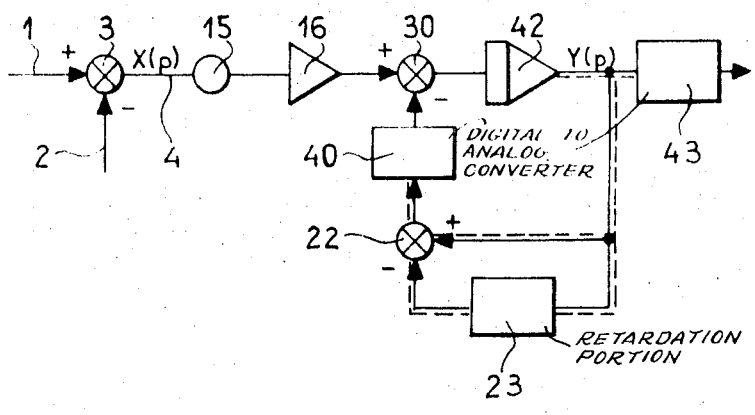
FIG.9 is a combined block and schematic diagram similar to FIG.8 but including analog-digital conversion facilities.

A simplified version of the arrangement of FIGS.6 and 7 is shown in FIGS.8 and 9. The latter differ from each other only in the fact that FIG.8 is analog in form while FIG.9 is part analog and part digital. In FIG.8, the network 9 includes a potentiometer 15 and an amplifier 16 having a combined transfer function $1 \div K_0$. The network 10 includes an integrator 42 having a transfer function $Q \div pT_0$. The network 13 takes the form of a direct electrical connection having a unity transfer function between the terminal T and the associated input of the subtracter 11.

FIG.9 which is functionally the same as FIG.8 includes (1) analog-to-digital conversion facilities in the integrator 42; (2) digital arrangements in the subtracter 11 and retardation circuits 23; and (3) digital-to-analog converters 40 and 43.

It is to be understood that the above described embodiments are merely illustrative of the principles of the invention. Numerous other modifications will now suggest themselves to those skilled in the art. Such modifications may obviously be devised without departing from the spirit and scope of the invention.

What is claimed is:

1. In a closed-loop control system including a controller regulating a time-retarded process having an effective transfer function F × G, where G represents an equivalent unretarded transfer function of the process and F represents the retardation factor, an improved controller arrangement for eliminating the effect of process time delay from the closed loop system, which comprises:

first and second subtracting means each having first and second inputs;

a first network for coupling the input terminal of the controller to a first input of the first subtracting means;

a second network having a transfer function equal to the product of G and the transfer function of the first network for coupling the output terminal of the controller to the first input of the second subtracting means;

a retardation circuit having the transfer function F for coupling the output of the second network to the second input of the second subtracting means;

means for applying the output of the second subtracting means to the second input of the first subtracting means;

means for transferring the output of the first subtracting means to the output terminal of the controller;

the transfer function G being of the form $K_0 \div (1 + pT_0)$; the first network comprising means for generating a first signal proportional by a factor $1 \div K_0$ to a signal appearing at the controller input terminal; and the second network comprising, in combination, means for generating a second signal proportional by a factor $1 \div pT_0$ to a signal applied thereto;

third subtracting means;

first means for connecting the second network output to the first input of the third subtracting means;

means for applying the output of the third subtracting means to the input of the second signal generating means; and means for coupling the output terminal of the controller to the input of the third subtracting means.

2. A system as defined in claim 1, in which the transferring means comprises, in combination, means for generating a third signal proportional by a factor Q to the output of the first subtracting means;

means for generating a fourth signal proportional by a factor $Q \div pT_0$ to the output of the first subtracting means;

first adding means;

means for applying the third and fourth signals to the respective inputs of the first adding means; and means for coupling the output of the first adding means to the controller output terminal.

* * * * *